United States Patent
Blatt et al.

(10) Patent No.: US 10,467,403 B1
(45) Date of Patent: Nov. 5, 2019

(54) METHODS AND APPARATUS FOR EVALUATING CLASSIFICATION PERFORMANCE OF RISK ENGINE MODELS

(71) Applicant: EMC IP Holding Company LLC, Hopkinton, MA (US)

(72) Inventors: Marcelo Blatt, Modiin (IL); Alon Kaufman, Bnei Dror (IL); Yael Villa, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 13/931,135

(22) Filed: Jun. 28, 2013

(51) Int. Cl.
*G06F 21/50* (2013.01)

(52) U.S. Cl.
CPC .................... *G06F 21/50* (2013.01)

(58) Field of Classification Search
CPC ............. H04L 63/1416; H04L 63/1408; H04L 63/145; H04L 63/1441; H04L 63/1458; G06F 21/50
USPC .......................................................... 726/22
See application file for complete search history.

(56) References Cited

U.S. PATENT DOCUMENTS

| | | | | |
|---|---|---|---|---|
| 7,545,961 B2 * | 6/2009 | Ahern | ..................... | G06F 21/32 382/115 |
| 7,545,962 B2 * | 6/2009 | Peirce | ..................... | G06F 21/32 382/115 |
| 7,552,035 B2 * | 6/2009 | Cataltepe | ........... | G05B 23/0243 702/183 |
| 2011/0106734 A1 * | 5/2011 | Boult | .................. | G06F 11/0751 706/12 |
| 2012/0167183 A1 * | 6/2012 | Langley | ................ | H04L 9/3231 726/5 |

OTHER PUBLICATIONS

Zhou, Xiao-Hua, Nancy A. Obuchowski, and Donna K. McClish. Statistical methods in diagnostic medicine. vol. 712. John Wiley & Sons, 2011.*
Obuchowski, Nancy A., and Donna Katzman McClish. "Sample size determination for diagnostic accuracy studies involving binormal ROC curve indices." Statistics in medicine 16.13 (1997): 1529-1542.*
NPL Search—Google Scholar (Year: 2019).*
Wojtek J. Krzanowski and David J. Hand, ROC Curves for Continuous Data, Section 4.2.2, pp. 77-78 (CRC Press, 2009).

\* cited by examiner

*Primary Examiner* — Mahfuzur Rahman
*Assistant Examiner* — Richard W Cruz-Franqui
(74) *Attorney, Agent, or Firm* — Ryan, Mason & Lewis, LLP (57) ABSTRACT

Methods and apparatus are provided for evaluating the classification performance of different risk engine models. A classification performance of an authentication method is evaluated by obtaining performance data for an authentication method; generating a receiver operating characteristic (ROC) curve for the obtained performance data; determining a partial area under the curve (pAUC) for a region of interest of the ROC curve; and providing a performance score for the authentication method based on the pAUC. The region of interest comprises, for example, a region of false positives. The pAUC is optionally standardized using a McClish Transformation. The performance score for the authentication method can be compared to a second performance score for a second authentication method. A confidence level can optionally be provided for the comparison based on a natural test statistic.

20 Claims, 5 Drawing Sheets

| SAMPLE SIZE | FRAUD | | NON-FRAUD | | SCORE BAND AND PERCENTILE | | | | | |
|---|---|---|---|---|---|---|---|---|---|---|
| | TRX | PROP | TRX | PROP | 900–1000 99.75 | 800–1000 99.50 | 700–1000 99.00 | 650–1000 98.00 | 600–1000 97.00 |
| 1,056,881 | 1,399 | 0.13 | 1,055,482 | 99.87 | 27.7 | 42.3 | 58.4 | 72.8 | 79.5 |
| 105,688 | 1,399 | 1.32 | 104,289 | 98.68 | 8.9 | 17.3 | 31.5 | 52.5 | 65.7 |
| 10,569 | 1,399 | 13.23 | 9,160 | 86.77 | 1.1 | 2.3 | 4.7 | 9.4 | 14.2 |

METHODS AND APPARATUS FOR EVALUATING CLASSIFICATION PERFORMANCE OF RISK ENGINE MODELS

FIELD OF THE INVENTION

The present invention relates generally to techniques for evaluating performance of risk engine models.

BACKGROUND OF THE INVENTION

Adaptive authentication systems aim to identify fraudulent users even though such users possess credentials to gain access to account information of a legitimate user. For example, each login attempt is received at a service provider at a particular time and in many cases, a fraudulent user will send login attempts at times or locations outside of those expected by a service provider. Existing adaptive authentication techniques compare information associated with a login attempt, such as the time of the login and a location from where the login originated, with a historical record of a typical user who exhibits some expected login behavior.

An important component of any adaptive authentication system is the risk engine (RE). A risk engine is a self-learning system that generates a unique risk score for each activity. The risk score indicates the likelihood that an activity is fraudulent (e.g., the likelihood that an impersonator is performing a transaction using credentials of a real user).

The need for improved and comprehensive authentication systems is rising every day, for example, due to constantly changing fraud patterns and the increase in cybercrime and fraud. Many adaptive authentication systems employ a number of different authentication methods and/or change authentication methods or risk models in order to ensure the security level required by customers. Authentication methods include, for example, simple passwords, one-time passcodes, biometrics, tokens and certificates. Each authentication method varies by the strength of the method, the addressed authentication factors, and the usability and cost of the method. Existing authentication systems select one or more suitable authentication methods based on the sensitivity and risk of the activity, taking into account usability and cost constraints.

A need therefore exists for effective mechanisms for evaluating the classification performance of different authentication methods and risk models.

SUMMARY OF THE INVENTION

The present invention in the illustrative embodiments described herein provides methods and apparatus for evaluating the classification performance of different risk engine models. In accordance with one aspect of the invention, a classification performance of an authentication method is evaluated by obtaining performance data for an authentication method; generating a receiver operating characteristic (ROC) curve for the obtained performance data; determining a partial area under the curve (pAUC) for a region of interest of the ROC curve; and providing a performance score for the authentication method based on the pAUC. The region of interest comprises, for example, a region of false positives.

According to a further aspect of the invention, the pAUC is optionally standardized using a McClish Transformation. The McClish Transformation provides a performance score, for example, in a range of 0.5 to 1. According to another aspect of the invention, the performance score for the authentication method can be compared to a second performance score for a second authentication method. A confidence level can optionally be provided for the comparison based on a natural test statistic. The natural test statistic can be based, for example, on McClish Indices $\eta_1$ and $\eta_2$ for the authentication method and the second authentication method, respectively.

The performance evaluation techniques of the illustrative embodiments overcome one or more of the problems associated with the conventional techniques described previously and provide improved security by providing an objective measure to assess performance of authentication methods. These and other features and advantages of the present invention will become more readily apparent from the accompanying drawings and the following detailed description.

DETAILED DESCRIPTION

The present invention provides methods and apparatus for comparing the classification performance of different risk engine models. Aspects of the present invention recognize that the performance data that must be processed typically has a very narrow operating range (e.g., the number of false positives is bounded to only a few percent) and is typically skewed (e.g., the data is strongly unbalanced since the number of fraudulent transactions is much smaller than the non-fraudulent transactions). Consequently, the "cost" of a misclassified transaction is not the same for a missed fraudulent transaction than presuming that a legitimate transaction is fraudulent. In addition, the "benefit" of correctly detecting a fraud should be much higher than the one of identifying a genuine transaction appropriately.

The current approach for comparing classification performance relies on the estimation of the Fraud Detection Rate (FDR), discussed further below. The Fraud Detection Rate cannot determine whether a new model is "significantly better" than the current one and does not provide a single summary index. In addition, with the Fraud Detection Rate, different sampling schemes will produce different FDR values for the same score-bands, thereby preventing the direct comparison of the FDRs obtained in different environments.

According to one aspect of the present invention, a set of statistical measures are used to compare various authentication methods. As discussed further below, a partial area under the curve (pAUC) of the receiver operating characteristic (ROC) is used as a local comparative approach in the region of interest (i.e., the region of false positives). The pAUC is optionally standardized with a McClish transformation of the pAUC.

Figure 1:
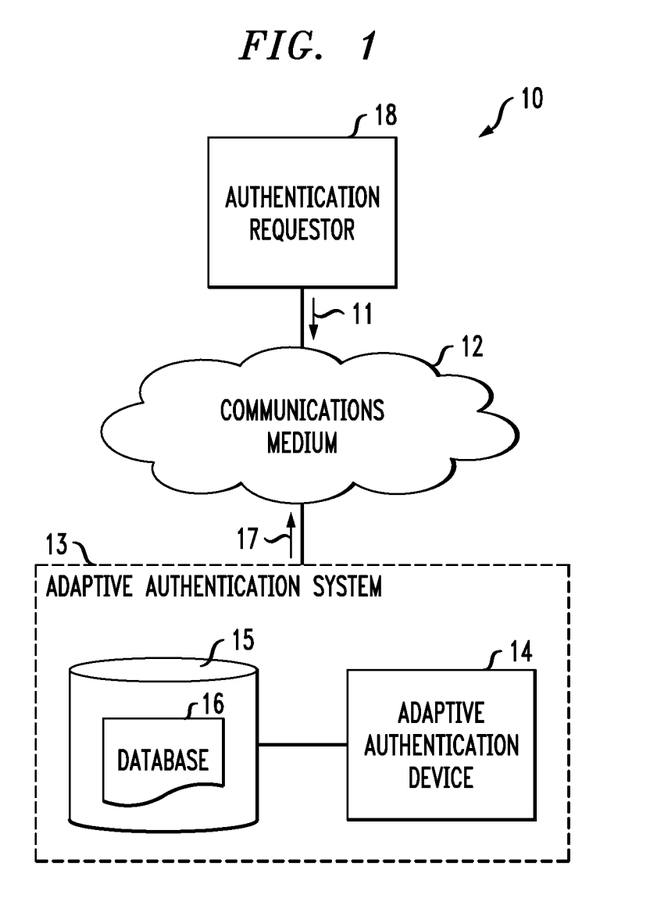
FIG. 1 is a schematic diagram illustrating an electronic environment in which the present invention can be implemented.

FIG. 1 illustrates an exemplary electronic environment 10 for carrying out the improved comparison techniques. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point-to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is at high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, the baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data.

Adaptive authentication device 14 is constructed and arranged to perform adaptive authentication operations on request 11 according to the improved techniques and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
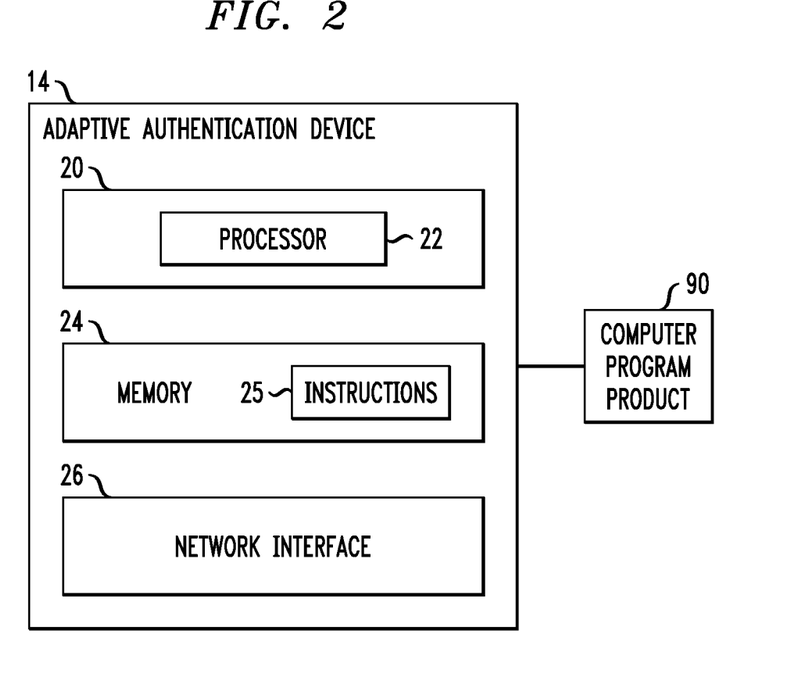
FIG. 2 is a schematic diagram illustrating an adaptive authentication device within the electronic environment shown in FIG. 1.

FIG. 2 illustrates components of exemplary adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited to those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Processor 22 optionally then combines the fact values stored in memory 24 with the fact values in the entry of database 16 that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States patent application entitled "Techniques for Authenticating Users of Massive Multiplayer Online Role Playing Games Using Adaptive Authentication,", each incorporated by reference herein Additionally, the adaptive authentication server 14 updates its records in the user database 16 with data gathered during the user login attempt. Such information may include identification information of a new user device, a new location, a new access time, adaptive authentication result 17 which indicates whether the user is a high risk of being a fraudulent user and whether the adaptive authentication result 17 was correct, etc. Generally, the answer to the challenge is typically applied to an adapting algorithm and the classifier can be modified using supervised learning techniques to fit the new information.

Fraud Detection Rate (FRD)

As indicated above, a common practice for comparing the classification performance of two authentication methods is to use the Fraud Detection Rate (FRD). The Fraud Detection Rate is defined as the number of correctly detected fraud transactions divided by the number of actual fraud transactions above a chosen threshold. Given that each score threshold can be associated with a fraction of the total number of transactions that are above it, the FDR is the fraction of transactions predicted correctly as fraudulent when a specific percentage of the transactions are challenged. The common practice is to use the following score bands: 900-1000, 800-1000, 700-1000, 650-1000 and 600-1000; corresponding to the following percentiles: 99.75%, 99.50%, 99%, 98% and 97% due to the normalization process. Although the Fraud Detection Rate provides a good insight of expected performance, the Fraud Detection Rate cannot determine whether a new model is "significantly better" than the current one and does not provide a single summary index.

An even more serious issue with the Fraud Detection Rate is that different sampling schemes will produce different FDR values for the same score-bands preventing the direct comparison of the FDRs obtained in different environments, such as a lab, a quality assessment (QA) review or production, resulting from the bias introduced by the sampling used in each environment. Each environment was designed to fulfill a different purpose and therefore it is able to process a different number of transactions given the different running time requirements and computational resources. Production must process 100% of the transactions while QA typically processes all of the fraudulent transactions and 2% to 20% of the non-fraudulent transactions. Performing uniform sampling is not appropriate in this kind of problem given that the data is severely unbalanced (the number of non-fraudulent transactions is several orders of magnitude greater than the number of fraudulent transactions). A good practice in this situation is to keep all of the fraudulent transactions and sample uniformly the non-fraudulent transactions. This alters the relative weight of each class since the proportions of fraudulent and non-fraudulent transactions are modified. This in turn is reflected in the FDR given that for a particular threshold the fraction of non-fraudulent transactions will be lower as its sampling decreases. For example, consider three sampling scenarios of the same data set for a specific customer; 10K, 100K, and 1M transactions, following the procedure described above.

Figure 3:
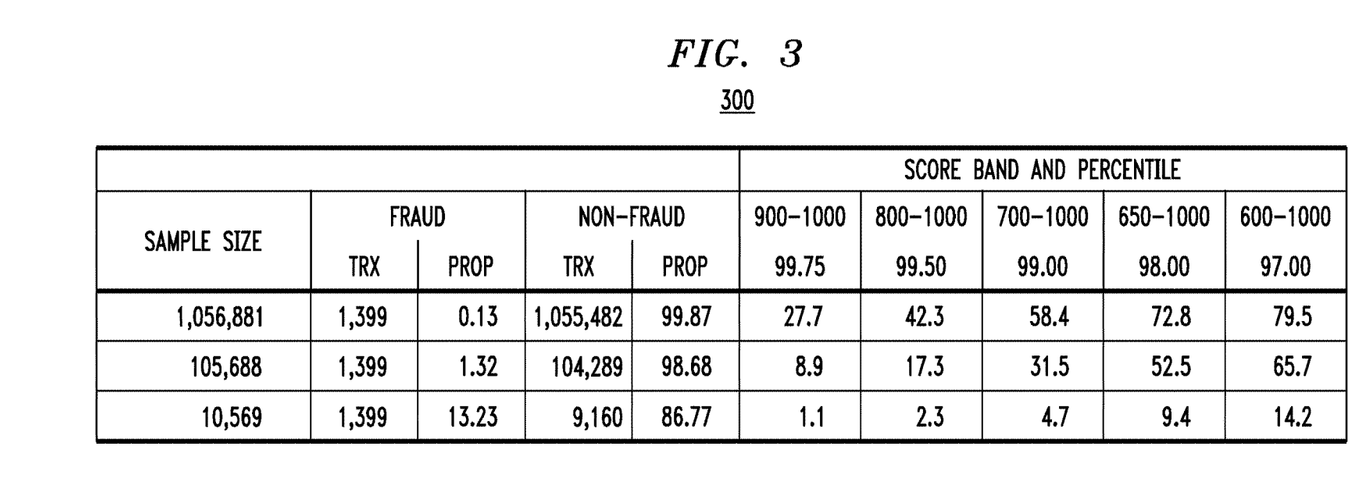
FIG. 3 is a table illustrating an effect of sampling size on a Fraud Detection Rate.

FIG. 3 is a table 300 illustrating the effect of sampling size on the Fraud Detection Rate. The table 300 presents the FDR for different sampling schemes where all the fraud transactions (TRX) were extracted, and number of non-fraudulent transactions (TRX) is varied. The proportion (prop) of fraudulent transactions to non-fraudulent transactions is shown. Consider, for example, a threshold 700 or a score band 700-1000 that corresponds to the top 1% of the transaction (as a result of normalization). As shown in FIG. 3, the resulting FDRs are 4.7%, 31.5% and 58.4% for sample sizes of =10K, 100K, 1M, respectively. Although they correspond to the same data set, the direct comparison between these figures is not immediate.

Receiver Operating Characteristic (ROC)

The receiver operating characteristic (ROC) presents the performance of a specific authentication method by showing the hit-rate or true-positive-rate (i.e., the proportion of correctly classified fraudulent observations) as a function of the false-positive-rate (i.e., the proportion of non-fraudulent/genuine misclassified transactions). Aspects of the present invention recognize that ROC allows alternative authentication methods to be evaluated without defining a specific threshold. In addition, the ROC is not sensitive to the fact that the sampling of fraudulent and non-fraudulent classes is sampled differently.

Figure 4:
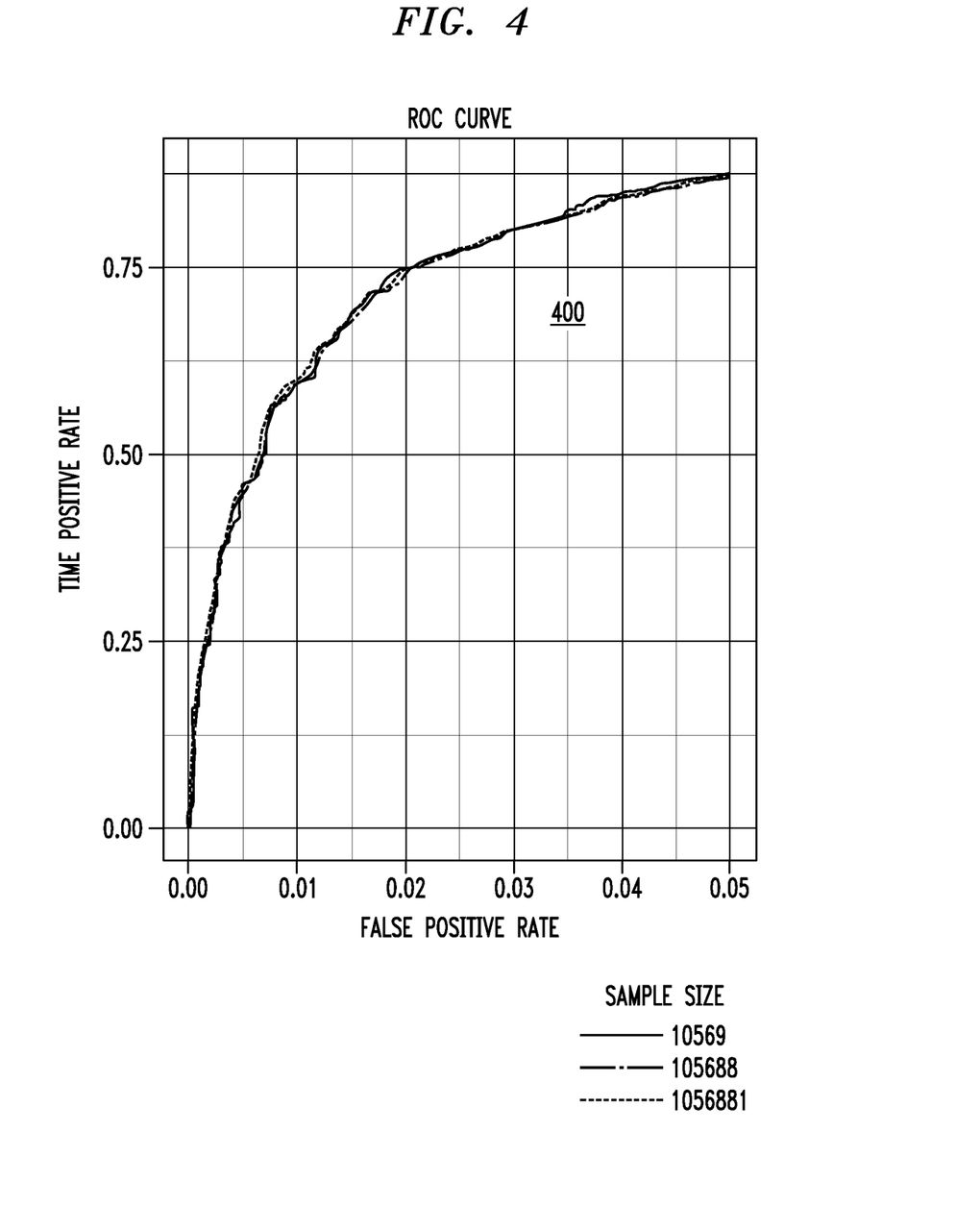
FIG. 4 illustrates receiver operating characteristic curves for the same sampling data sets presented in FIG. 3.

FIG. 4 illustrates ROC curves 400 for the same sampling data sets presented in FIG. 3. Although the FRDs in FIG. 3 are significantly different for each sampling size, the detection rate (true positive rate) using ROC is 61% for a false detection rate of 1% for all three sampling cases. Thus, as shown in FIG. 4, the ROC is insensitive to skew class distribution since they do not depend on class probabilities, facilitating their interpretation and comparison across different data sampling schemes.

A summary-index of the ROC is the area under the curve (AUC), which measures the performance of a classifier. AUC is often applied for assessing discriminative ability of a model. Evaluating an authentication method by means of a total AUC, however, is not suitable since the performance assessment only takes place in a low false positive rate, as mentioned above. To account for these cases, another aspect of the invention employs a partial AUC (pAUC) as a local comparative approach that focuses only on a portion of the ROC curve, as follows:

$$pAUC(\phi_1, \phi_2) = \int_{\phi_1}^{\phi_2} \tau_{(\phi)} d\phi,$$

where $\phi$ is the false positive rate, $\tau$ the true positive rate and $\phi_1$, $\phi_2$ define the region of interest. For example, $\phi_1$, $\phi_2$ may define a range between 0 and 0.02 (2%).

The pAUC may be difficult to interpret since the resulting pAUC value depends heavily on the limits of the integral, $\phi_1$ and $\phi_2$. According to a further aspect of the invention, the pAUC can optionally be standardized with a McClish transformation;

$$\eta = \frac{1}{2}\left(1 + \frac{pAUC - A_R}{A_P - A_R}\right)$$

where $A_R$ is the pAUC over the same region of interest in the ROC curve 400 for a random classification, and $A_P$ is the pAUC over the same region of interest in the perfect ROC curve. The result is a standardized pAUC which has a value of 1 for a full discriminant classifier and a value of ½ for a non-discriminant classifier, regardless of the partial region defined.

According to another aspect of the invention, hypothesis testing provides a mechanism for testing whether a model (authentication method) under study has an improved ability to discriminate between fraudulent and genuine transactions by testing whether the corresponding pAUC value is significantly greater than the pAUC value corresponding to the current model. The one-sided hypothesis seems appropriate, as the new risk model is useful if its ROC lies uniformly above the ROC curve of the previous one in the region of interest (typically 0 to 2%). Using hypothesis testing terminology, the null and alternative hypotheses are expressed as follows:

$H_0$: $pAUC_{current\ model} \leq pAUC_{new\ model}$ $H_1$: $pAUC_{current\ model} > pAUC_{new\ model}$ A natural test statistic is $$Z = \frac{\eta_2 - \eta_1}{\sigma_{(\eta_2 - \eta_1)}}$$

A confidence level can optionally be provided for the comparison based on the natural test statistic. The natural test statistic can be based, for example, on the McClish Indices $\eta_1$ and $\eta_2$ for the first authentication method and the second authentication method, respectively. Given that there is not a closed (analytical) expression for calculating the standard deviation of the difference of two McClish Indices, $\eta_1$ and $\eta_2$, it is necessary to use numerical methods. One possibility is to use a bootstrap percentile method. In each replicate i, the original measurements are re-sampled with replacement; both new ROC curves corresponding to this new sample are built, the re-sampled AUCs) $\eta_1^{(i)}$ and $\eta_2^{(i)}$ and their difference $\Delta_i = \eta_1^{(i)} - \eta_2^{(i)}$ are computed. $\eta_1$ and $\eta_2$ are the corresponding averages and $\sigma_{(\eta_1 \text{ and } \eta_2)}$ is computed as the standard deviation of $\{\Delta_1, \Delta_2, \Delta_N\}$, where N is the number of replications. Using the approximate normality of Z, $H_0$ is rejected for a significance level a (the probability of rejecting the null hypothesis when it is true) if the calculated value of Z exceeds $Z_{1-\alpha}$, obtained from $$1 - \alpha = \Phi(Z_{1-\alpha})$$

where $\Phi$ is the normal cumulative distribution function. Then, $\Phi(Z_{1-\alpha}) = p(Z \leq Z_{1-\alpha})$ so that $p(Z > Z_{1-\alpha}) = \alpha$, and therefore $H_0$ is rejected if $Z > Z_{1-\alpha}$.

Figure 5:
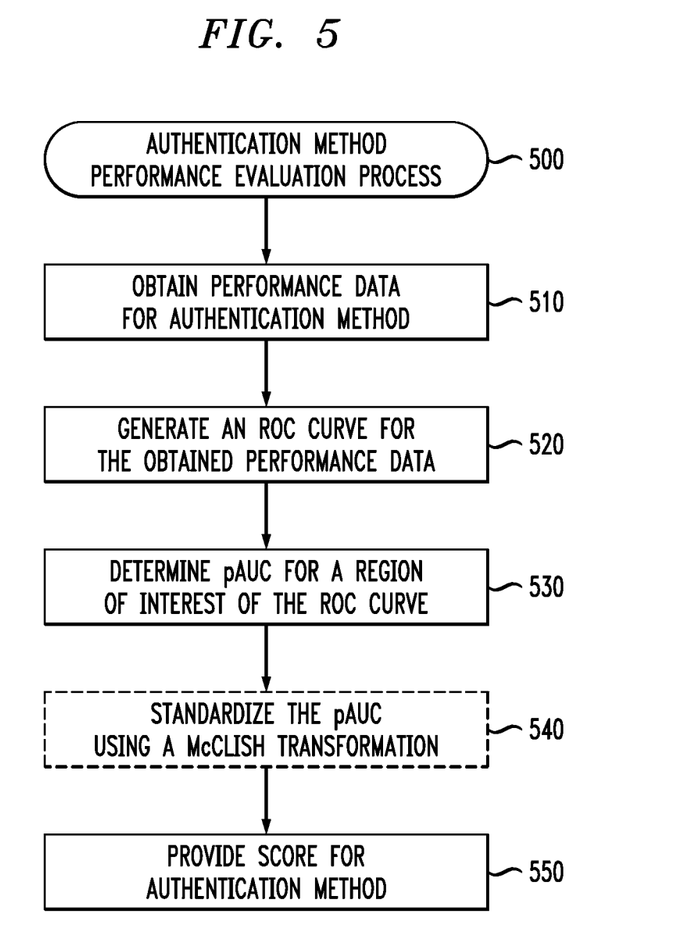
FIG. 5 is a flow chart describing an exemplary implementation of an authentication method performance evaluation process that incorporates aspects of the present invention.

FIG. 5 is a flow chart describing an exemplary implementation of an authentication method performance evaluation process 500 that incorporates aspects of the present invention. As shown in FIG. 5, the exemplary authentication method performance evaluation process 500 initially obtains performance data for an authentication method to be evaluated during step 510.

An ROC Curve is then generated during step 520 for the obtained performance data. The pAUC is determined for a region of interest (e.g., false positives) of the ROC curve during step 530. The pAUC is optionally standardized during step 540 using a McClish Transformation.

The resulting score for the authentication method is then provided during step 550.

Among other benefits, the disclosed pAUC comparison approach summarizes the results in a single value; incorporates information across multiple operating points of the range of interest, rather than limiting to only one point; provides a measure of a significance level; is weakly affected by the sampling scheme used; enables a direct comparison of tests of the same models performed in different environments; and allows lab estimations to be used to estimate classification performance in production.

The disclosed pAUC comparison approach can be used, for example, in the following exemplary applications:

Model Evaluation: when considering the introduction of a new predictor, category or group as a result of the identification of a new fraud pattern;

Risk Engine Assessment: a typical case would be the case when evaluating changes in the authentication method such as modification in the profile mechanisms or the removal of old profiles;

Continuous Monitoring: ongoing classification quality assessment could be used for a variety of applications such as System Health Monitoring (early detection of system performance degradation can be used to trigger an alarm or to issue a special report for the analysis team; Fallback to a more Secure Model (in case of a major degradation, the system could switch to a more solid model such as a static one that would be able to provide consistent risk assessment); and Running Simultaneous Models/Risk Engines (several instances would run in parallel and use for the next day the one showing highest performance in the learning period (such as one week).

Smooth Upgrade: when a system upgrade will be performed, two models and/or Risk Engines will run simultaneously and the switch between the new and old authentication methods once the new authentication method is "ready", i.e., when the performance of the upgraded model/Risk Engine is higher than the working version).

Compare with other Solutions: having an objective way of comparing solution performance that do not depend on specific Risk Engine thresholds).

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to a comparison of adaptive authentication devices 14. Some embodiments are directed to a system or method that compares performance of a plurality of available authentication methods. Also, some embodiments are directed to a computer program product that enables computer logic to compare performance of a plurality of available authentication methods.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

As mentioned previously herein, the above-described embodiments of the invention are presented by way of illustrative example only. Numerous variations and other alternative embodiments may be used.

The term "authentication information" as used herein is intended to include passwords, passcodes, answers to life questions, or other authentication credentials, or values derived from such authentication credentials, or more generally any other information that a user may be required to submit in order to obtain access to an access-controlled application.

The illustrative embodiments of the invention as described herein provide an improved comparison of the performance of a plurality of available authentication methods. Advantageously, the illustrative embodiments do not require changes to existing communication protocols. It is therefore transparent to both existing applications and communication protocols.

It should again be emphasized that the particular authentication techniques described above are provided by way of illustration and should not be construed as limiting the present invention to any specific embodiment or group of embodiments. For example, as previously noted, the described embodiments may be adapted in a straightforward manner to operate with other types of authentication information, other types of authentication methods and other types of access-controlled resources. Also, the particular configuration of system elements shown in the figures and their interactions may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method, comprising:
    obtaining performance data for a first authentication method;
    generating, using at least one processing device, a receiver operating characteristic (ROC) curve for said obtained performance data;
    determining a partial area under the curve (pAUC) for a region of interest of the ROC curve;
    providing a first performance score for the first authentication method based on the pAUC;
    storing said first performance score in at least one record of at least one memory;
    comparing, using said at least one processing device, said first performance score for said first authentication method to a second performance score for a second authentication method; and
    selecting, using said at least one processing device, one of said first authentication method and said second authentication method for authenticating one or more users based on the comparison and a confidence level for a result of said comparison of said first performance score for said first authentication method and said second performance score for said second authentication method based on a natural test statistic that is a function of the pAUC.

2. The method of claim 1, wherein said region of interest comprises a region of false positives.

3. The method of claim 1, further comprising the step of standardizing the pAUC using a McClish Transformation.

4. The method of claim 1, wherein said natural test statistic is based on McClish Indices $\eta_1$ and $\eta_2$ for said first authentication method and said second authentication method, respectively.

5. The method of claim 1, wherein said ROC curve comprises a true-positive-rate as a function of a false-positive-rate.

6. The method of claim 1, wherein said pAUC evaluates a portion of the ROC curve.

7. The method of claim 1, wherein said first performance score characterizes a classification performance of said first authentication method.

8. The method of claim 1, wherein said first authentication method comprises an evaluation of one or more of a password, a one-time passcode, biometric information, a token and a certificate.

9. The method of claim 1, wherein said first authentication method comprises a current authentication method and said second authentication method comprises an updated authentication method.

10. A non-transitory machine-readable storage medium having encoded therein executable code of one or more software programs, wherein the one or more software programs when executed by at least one processing device perform the following steps:
    obtaining performance data for a first authentication method;
    generating a receiver operating characteristic (ROC) curve for said obtained performance data;
    determining a partial area under the curve (pAUC) for a region of interest of the ROC curve;
    providing a first performance score for the first authentication method based on the pAUC;
    storing said first performance score in at least one record of at least one memory;
    comparing, using said at least one processing device, said first performance score for said first authentication method to a second performance score for a second authentication method; and
    selecting, using said at least one processing device, one of said first authentication method and said second authentication method for authenticating one or more users based on the comparison and a confidence level for a result of said comparison of said first performance score for said first authentication method and said second performance score for said second authentication method based on a natural test statistic that is a function of the pAUC.

11. The non-transitory machine-readable storage medium of claim 10, wherein said first performance score characterizes a classification performance of said first authentication method.

12. An apparatus, the apparatus comprising:
    a memory; and
    at least one processing device, coupled to the memory, operative to:
    obtain performance data for a first authentication method;
    generate, using said at least one processing device, a receiver operating characteristic (ROC) curve for said obtained performance data;
    determine a partial area under the curve (pAUC) for a region of interest of the ROC curve;
    provide a first performance score for the first authentication method based on the pAUC;
    store said first performance score in at least one record of at least one memory;
    compare, using said at least one processing device, said first performance score for said first authentication method to a second performance score for a second authentication method; and
    select, using said at least one processing device, one of said first authentication method and said second authentication method for authenticating one or more users based on the comparison and a confidence level for a result of said comparison of said first performance score for said first authentication method and said second performance score for said second authentication method based on a natural test statistic that is a function of the pAUC.

13. The apparatus of claim 12, wherein said region of interest comprises a region of false positives.

14. The apparatus of claim 12, wherein said at least one processing device is further configured to standardize the pAUC using a McClish Transformation.

15. The apparatus of claim 14, wherein said natural test statistic is based on McClish Indices $\eta_1$ and $\eta_2$ for said first authentication method and said second authentication method, respectively.

16. The apparatus of claim 12, wherein said ROC curve comprises a true-positive-rate as a function of a false-positive-rate.

17. The apparatus of claim 12, wherein said pAUC evaluates a portion of said ROC curve.

18. The apparatus of claim 12, wherein said apparatus is implemented as part of a processing platform.

19. The apparatus of claim 12, wherein said first performance score characterizes a classification performance of said first authentication method.

20. The apparatus of claim 12, wherein said first authentication method comprises a current authentication method and said second authentication method comprises an updated authentication method.

* * * * *